(12) United States Patent (10) Patent No.: US 8,393,773 B2
Lea (45) Date of Patent: Mar. 12, 2013

(54) LIGHT-GUIDE LIGHTS PROVIDING A SUBSTANTIALLY MONOCHROMATIC BEAM

(75) Inventor: Michael Charles Lea, Bracknell (GB)

(73) Assignee: 3M Innovative Properties Company, St. Paul, MN (US)

(*) Notice: Subject to any disclaimer, the term of this patent is extended or adjusted under 35 U.S.C. 154(b) by 2171 days.

(21) Appl. No.: 10/491,504

(22) PCT Filed: Aug. 28, 2002

(86) PCT No.: PCT/US02/27505
§ 371 (c)(1),
(2), (4) Date: Mar. 31, 2004

(87) PCT Pub. No.: WO03/029722
PCT Pub. Date: Apr. 10, 2003

(65) Prior Publication Data
US 2004/0196667 A1 Oct. 7, 2004

(30) Foreign Application Priority Data
Oct. 3, 2001 (GB) .................................... 0123815.3

(51) Int. Cl.
*F21V 7/04* (2006.01)
(52) U.S. Cl. .................... 362/560; 362/30; 362/230
(58) Field of Classification Search .................. 362/628, 362/511, 606, 607, 617, 618, 624
See application file for complete search history.

(56) References Cited

U.S. PATENT DOCUMENTS

| | | | |
|---|---|---|---|
| 3,821,590 A * | 6/1974 | Kosman et al. | 313/499 |
| 4,161,015 A | 7/1979 | Dey et al. | |
| 4,649,462 A | 3/1987 | Dobrowolski et al. | |
| 5,101,325 A | 3/1992 | Davenport et al. | |
| 5,136,479 A * | 8/1992 | Ruffner | 362/29 |

(Continued)

FOREIGN PATENT DOCUMENTS

| | | |
|---|---|---|
| EP | 0 377 309 | 7/1990 |
| EP | 1 059 484 | 12/2000 |

(Continued)

OTHER PUBLICATIONS

"Lighting—New Technology, New Techniques", *Optics & Photonics News*, by T. Fohl, E.R. Freniere and J.T. Remillard (Aug. 2001).

(Continued)

*Primary Examiner* — Hargobind S Sawhney
(74) *Attorney, Agent, or Firm* — Robert S. Moshrefzadeh

(57) ABSTRACT

A light-guide light is described that is capable of providing a substantially monochromatic beam of light, and is suitable for use as a signal lamp in an automotive vehicle. The light (1) comprises a housing defining a light-guiding optical cavity (4) having first and second major faces (5, 6), and a light source (11) arranged to direct light into the cavity from one side. The light source may be an array of light emitting diodes providing substantially monochromatic light. The first major face (5) comprises an interference film (for example, a multilayer polymeric film) that, for light at the design wavelength, substantially transmits light that is incident on the film over a limited angular range and substantially reflects light that is incident at other angles. The second major face (6) comprises a scattering reflective material having a reflectance of at least 85%, for example a highly-efficient reflective material provided with a suitable textured pattern.

23 Claims, 4 Drawing Sheets

U.S. PATENT DOCUMENTS

| | | |
|---|---|---|
| 5,165,772 A | 11/1992 | Wu |
| 5,375,043 A | 12/1994 | Tokunaga |
| 5,684,633 A | 11/1997 | Lutz et al. |
| 5,700,078 A | 12/1997 | Fohl et al. |
| 5,774,278 A * | 6/1998 | Kaplan .......................... 359/723 |
| 5,791,757 A | 8/1998 | O'Neil et al. |
| 5,857,770 A | 1/1999 | Fohl et al. |
| 5,882,774 A | 3/1999 | Jonza et al. |
| 5,890,796 A | 4/1999 | Marinelli et al. |
| 6,036,329 A * | 3/2000 | Iimura .......................... 362/607 |
| 6,036,340 A | 3/2000 | Fohl et al. |
| 6,078,421 A | 6/2000 | Davey et al. |
| 6,080,467 A | 6/2000 | Weber et al. |

FOREIGN PATENT DOCUMENTS

| | | |
|---|---|---|
| GB | 2 310 525 | 8/1997 |
| WO | WO 97/01774 | 1/1997 |
| WO | WO 99/36258 | 7/1999 |
| WO | WO 00/65277 | 11/2000 |

OTHER PUBLICATIONS

Application Bulletin "Thin Light Box", Minnesota Mining and Manufacturing Co., (Mar. 1990).

"Daylighting in Architecture—A European Reference Book", publ. James and James, London (1993), ISBN 1-873936-21-4, pp. 4.3-4.5.

* cited by examiner

LIGHT-GUIDE LIGHTS PROVIDING A SUBSTANTIALLY MONOCHROMATIC BEAM

FIELD OF THE INVENTION

The present invention relates to light-guide lights capable of providing a substantially monochromatic beam of light and suitable for use as signal lamps, for example for automotive vehicles.

BACKGROUND OF THE INVENTION

It is already known to use light guides to illuminate panels for general lighting purposes and for display applications (e.g. for illuminating signs and advertisements, and also for illuminating liquid crystal displays). More recently, it has also been proposed that light guides could be used as the basis for signal lamps, for example for the head or tail lights of automotive vehicles, to replace the conventional signal lamps that typically comprise an incandescent bulb and a reflector together with a lens system for shaping and directing the lamp output beam. Conventional signal lamps of that type are comparatively inefficient and bulky, and are often not aesthetically pleasing. In addition, the bulb position is usually visible through the lens system resulting, in use, in "hot spots" and a generally non-uniform appearance. It has been suggested that some, at least, of those disadvantages could be overcome through the use of light guides.

An additional reason for the increasing interest in light guides as the basis for signal lamps is that they make it possible to use light-emitting diodes (LEDs), or other solid state light-emitting devices as light sources. Light-emitting diodes are becoming increasingly reliable and available at lower costs, and offer particular advantages as light sources because they take up only a small amount of space and are highly efficient in comparison with incandescent sources.

The application of light guides and diode lasers to the signal lamps of automotive vehicles is discussed in an article entitled "Lighting—New Technology, New Techniques" by T. Fohl, E. R. Freniere and J. T. Remillard that appeared in the August 2001 edition of "Optics & Photonics News". In addition, U.S. Pat. No. 5,700,078 describes a vehicle lighting system comprising a fibre optic light guide coupled, at one end, to a laser light source and, at the other end, to an optical element which forms, for example, a tail lamp of the vehicle. The optical element comprises a transparent, solid sheet of plastic through which light from the fibre optic light guide is guided by total internal reflection. Reflective surfaces in the optical element cause light to be directed out of the sheet, across the front surface thereof. Further modifications of that type of system, which enable the front surface area (or "footprint") of the optical element to be reduced, are described in U.S. Pat. Nos. 5,857,770; 5,791,757; 5,890,796 and 6,036,340. In each case, the optical element (i.e. the solid sheet of plastic) that forms the vehicle signal lamp is, effectively, an edge-lit solid light guide (i.e. a solid light-guiding plate into which light is directed in a direction generally parallel to a major surface of the plate from an elongated light source or a similar arrangement located adjacent an edge of the plate).

Other lamps formed from edge-lit solid light guides and suitable for use in vehicles are described in U.S. Pat. Nos. 5,101,325; 5,165,772 and 5,375,043. The problem of improving the appearance of vehicle lamps that are illuminated by a back light source is addressed in U.S. Pat. No. 5,684,633.

Illuminated panels based on hollow light guides are also known and have been proposed for use as display panels and for illuminating liquid crystal displays (see, for example, EP0377309; GB2 310 525; and an Application Bulletin entitled "Thin Light Box" issued in March 1990 by Minnesota Mining and Manufacturing Company of St. Paul, Minn., USA). In addition, U.S. Pat. No. 6,080,467 describes an illuminated sign comprising a light box, the interior surfaces of which comprise a multi-layer reflective optical film. Hollow light guides would appear to offer advantages for applications that require the weight of the light guide to be kept as low as possible but, despite that, solid light guides have typically been more widely used, because they are comparatively simple to produce and are the easiest way of transporting light.

U.S. Pat. No. 6,078,421 describes various backlight arrangements using substantially monochromatic light, particularly for illuminating a liquid crystal display. The backlight arrangements make use of an interference filter, comprising a stack of dielectric layers on a transparent substrate, in combination with a diffuse reflector to provide a collimated beam of monochromatic light. Luminaires that have a similar construction are described in U.S. Pat. Nos. 4,161,015 and 4,649,462.

An illuminated sign, suitable for use on an automotive vehicle, is described in WO 00/65277. The sign comprises a housing having diffusely-reflecting interior surfaces and a front sign face through which light from inside the housing is transmitted, the light being supplied by a light fibre located on an interior surface of the housing.

SUMMARY OF THE INVENTION

The present invention is concerned with the provision of an improved light-guide light suitable for use especially, but not exclusively, as a vehicle signal lamp.

The present invention provides a light-guide light comprising a housing defining a light-guiding optical cavity having first and second major faces, and a light source of substantially monochromatic visible light at a selected wavelength arranged to direct light into the cavity, to be guided between the major faces; wherein (a) the first major face comprises an interference film which, for light at the selected wavelength, substantially transmits such light that is incident on the film over a limited angular range and substantially reflects such light that is incident at other angles; and (b) the second major face comprises a scattering reflective material having a total reflectance of at least 85% for light at the selected wavelength incident on the surface at any angle;

whereby light from the said light source is emitted from within the optical cavity substantially uniformly across the first major face in the form of a substantially monochromatic beam of limited angular spread.

A light guide light in accordance with the invention may comprise two or more optical cavities each as defined above, preferably with monochromatic light sources that emit light at respective, different, wavelengths. The light outputs of the optical cavities may be combined (for example to yield a beam of white light). Alternatively, the respective light sources of the optical cavities may be operated in sequence, to change the colour of the output beam. In one embodiment, two optical cavities are arranged so that the interference film that provides the first major face of one optical cavity also provides the second major face of the second optical cavity and has a light-spreading structure formed thereon, whereby light from within the optical cavities is emitted substantially uniformly across the first major face of the second optical cavity. If the light sources of both optical cavities emit light at the same time, a beam of limited angular spread comprising a combination of light from both sources will be emitted from the first major face of the second optical cavity. If the light sources are switched so that light is emitted from only one source at a time, a beam of limited angular spread comprising light from the functioning source will be emitted from the first major face of the second optical cavity.

The present invention further provides a light-guide light comprising a housing defining a light-guiding optical cavity having first and second major faces, and a light source arranged to direct visible light into the cavity, to be guided between the major faces; wherein (a) the first major face comprises an interference film in the form of a multi-layer polymeric film which, at least for light at a selected wavelength, substantially transmits such light that is incident on the film over a limited angular range and substantially reflects such light that is incident at other angles, and an absorption filter arranged to receive light from the interference film, the absorption filter transmitting light at the said selected wavelength; and (b) the second major face comprises a scattering reflective material having a reflectance of at least 85% for visible light incident on the surface at any angle;

whereby light from the said light source is emitted from within the optical cavity substantially uniformly across the first major face in the form of a substantially monochromatic beam.

The term "scattering reflective material" means a material that reflects an incident collimated beam into a broadened beam having a dispersion angle of less than about 45°. The term "dispersion angle" means the angle between the direction of maximum intensity ($I_{max}$) of reflected light and the direction of intensity with a value $I_{max}/2$, assuming an intensity of reflected light distribution curve that is symmetrical about the direction of $I_{max}$. If the intensity distribution curve of the reflected light is not symmetrical about the direction of $I_{max}$, the term "dispersion angle" as used herein means the smallest angle between the direction of $I_{max}$ and a direction of intensity $I_{max}/2$. The broadened reflected beam may, or may not, exhibit a pronounced peak in the direction of maximum intensity.

By way of example only, embodiments of the invention will be described with reference to the accompanying drawings, in which:

DETAILED DESCRIPTION OF THE INVENTION

Figure 1:
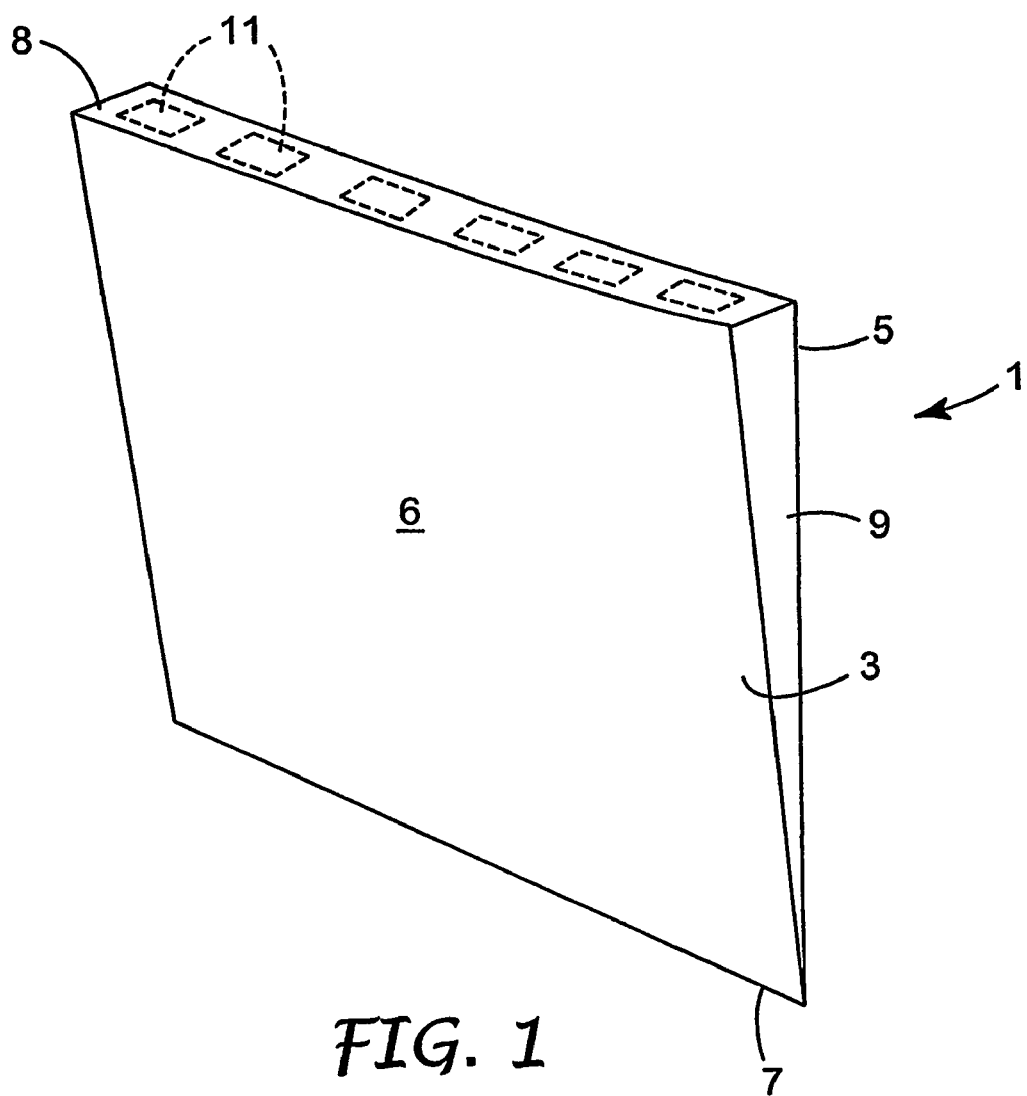
FIG. 1 is a perspective view from behind of a light-guide light constructed in accordance with the invention.
Figure 2:
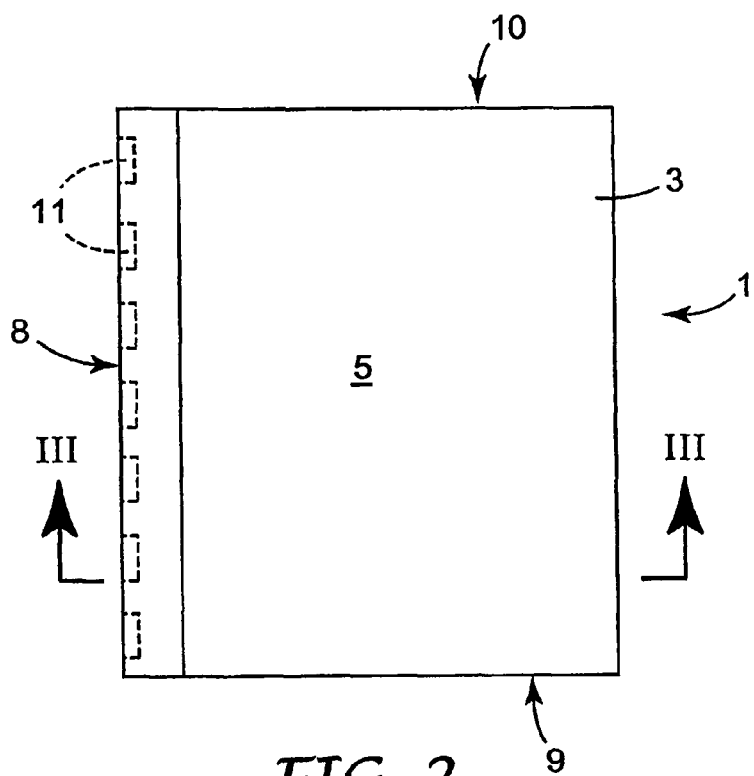
FIG. 2 is a front view of the light of FIG. 1.
Figure 3:
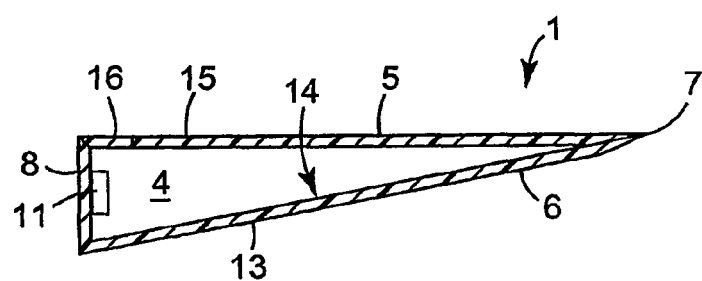
FIG. 3 is a cross-section on the line III-III of FIG. 2.

The light guide 1 shown in FIGS. 1 to 3 comprises a wedge-shaped housing 3 defining an optical cavity 4. The housing 3 has opposed major faces 5, 6 which are inclined to each other and meet at an edge 7, the opposite edge of the wedge being closed by a narrow face 8. In this embodiment, the narrow face 8 is perpendicular to the face 5, although that is not essential. The triangular ends of the wedge-shaped housing 1 are closed by end faces 9, 10. A source of substantially monochromatic light, in the form of a plurality of light emitting diodes (LEDs) 11, is arranged inside and along the edge face 8 of the light guide to direct light into the optical cavity 4. As described in greater detail below, the major face 5 forms a window through which light can be emitted from within the optical cavity and used for illumination purposes.

The optical cavity 4 inside the housing 3 is visible in the diagrammatic illustration of FIG. 3. The narrow side 8 of the housing, on which the LEDs 11 are mounted, and also the triangular end faces 9, 10, of the optical cavity have a highly-efficient reflecting surface on the side facing into the optical cavity 4. This reflecting surface can be provided by any suitable material but is preferably provided by a multi-layer optical film of the type described in U.S. Pat. No. 5,882,774 and WO97/01774. A suitable material is the film available, under the trade designation "VM 2000 Mirror Film", from 3M Company of St. Paul, Minn., USA.

The front and rear faces 5, 6 of the light guide comprise materials that, preferentially, guide the light from the LEDs 11 along the optical cavity 4 between the faces 5, 6 and towards the edge 7, although the material of the front face 5 will also permit light to leave the optical cavity when it is incident on the face 5 at certain angles, as described below.

More specifically, the rear face 6 of the light guide 1 comprises a sheet material 13 which provides a highly reflective surface 14 facing into the optical cavity 4, the reflective surface 14 being capable of causing limited controlled spreading of an incident light beam into a broadened reflected beam. Materials of this type are known under the general description "scattering reflective materials", and can be further classified as either "wide" or "narrow" scattering reflective materials, depending on the angular spread of the reflected beam (see "Daylighting in Architecture—A European Reference Book", published by James and James, London, 1993. ISBN 1-873936-21-4, at pages 4.3 to 4.5). In the light guide 1, the reflective surface 14 may be either a wide scattering reflector (meaning that it has a dispersion angle of between about 15° and 45°) or a narrow scattering reflector (meaning that it has a dispersion angle of less than about 15° or, more typically for the present application, between about 5° and 15°). In either case, the surface 14 should be such that its total reflectivity (integrated over all angles) is not reduced substantially for light that is incident in directions other than normal to the surface, and is at least 85% (preferably at least 90% and, most desirably, at least 98%). To achieve that, the reflective surface 14 may be a highly-efficient reflective surface provided with a textured pattern that is designed to spread the reflected light in the desired manner without substantially degrading the total reflectivity of the surface at the wavelength of interest. One example of a suitable scattering reflective material is the film material embossed with a sand-blast pattern that is available, under the trade designation "Radiant Light Film Embossed VM2000", from 3M Company of St. Paul, Minn., USA. An alternative sheet material is a highly reflective sheet metal material, for example sheet aluminium, formed with a suitable pattern to produce the desired spreading of the reflected light. In that case, a suitable pattern may be a pattern of dimples or bumps such as those produced by peening the sheet metal.

The front face 5 of the light guide comprises an interference film 15 that, at the wavelength of the light emitted by the LEDs 11, highly transmits such light when it is incident on the film at certain angles and becomes highly reflective for such light when it is incident on the film at other angles. This effect is achieved by designing the film 15 to have a transition at normal incidence from low reflectance/high transmission to high reflectance/low transmission at a wavelength slightly greater than the wavelength of the light emitted by the LEDs 11. This transition then shifts to shorter wavelengths as the angle of incidence becomes more oblique. As a result, the film 15 emits the LED light as a beam of limited angular spread. Interference films having these properties can comprise multilayer polymeric films as described in WO 99/36258. Suitable multilayer polymeric films are available, under the trade designation "Radiant Color Film", from 3M Company of St. Paul, Minn., USA.

Immediately adjacent the LEDs 11, the front face 5 of the light guide comprises a strip 16 of reflective material facing into the optical cavity 4 to prevent the direct emission of light from the diodes through the front face. This material may be the same as that used on the narrow side 8 of the optical cavity, behind the LEDs. It will be appreciated that the strip 16 would not be required if the LEDs were contained in a separate suitably-designed housing, outside the optical cavity 4.

The light guide 1 as described above functions as follows. Light from the LEDs 11 is directed into the optical cavity 4 and, at some stage, will be incident on the rear surface 6 where it will be spread on reflection. Some of the reflected light will, as a consequence of the spreading and the wedge shape of the optical cavity 4, subsequently impinge on the front face 5 of the light guide at such an angle that it can pass through the optical sheet material 15 and emerge from the light guide as a beam of limited angular spread in a direction normal to the plane of the film. Light that is incident at other angles on the front face 5 is reflected and recycled back into the optical cavity 4 and, at some subsequent stage, will again be incident on the rear surface. As a result of the combination of the scattering reflective material 13 on the rear face 6 of the optical cavity 4 and the multilayer polymeric film 15 on the front face 5, the light is emitted substantially uniformly across the front face despite having originated, effectively, from a series of point sources at the LEDs 11.

In one particular construction, designed to produce an orange/yellow output beam, the LEDs 11 are of a type available, under the trade designation "LY T676", from Infineon Technologies AG of Munich, Germany: these provide substantially monochromatic light at a wavelength of about 590 nm. The rear face 6 of the optical cavity 4 comprises a sheet of the above-mentioned "Radiant Light Film Embossed VM2000", embossed with a sand-blast pattern, and the front face 5 comprises a multilayer polymeric film of the type described in WO 99/36258 designed to transmit normally-incident light having a wavelength below about 640 nm and to reflect normally-incident light having longer wavelengths (or at least, wavelengths in the range of about 640 to about 900 nm). Light is emitted substantially uniformly across the front face 5 in the form of a forwardly-directed beam (i.e. one that is directed generally away from the LEDs 11). More specifically, the central axis of the beam extends in the forward direction at an angle of about 25° to the normal to the front face 5, with an angular spread (measured from the central axis to 50% of maximum intensity) of about 35° along a line parallel to the line of the LEDs 11 and of about 20° in the orthogonal direction. A suitable multi-layer polymeric film for the front face 5 of the optical cavity is available, under the trade designation "Dichroic Filter Film DFA-64-113", from 3M Company of St. Paul, Minn., USA. If that film is used, the front face 5 of the optical cavity has a blue/green colour when viewed from the front of the light guide 1 when the LEDs 11 are not illuminated.

Through the use of LEDs that emit light at other wavelengths in combination with appropriately-selected multilayer films 15, similar light-guide lights can be designed to provide output beams; of other colours. In each case, as a result of the combination of the scattering reflective material 13 on the rear face 6 of the optical cavity 4 and the film 15 on the front face 5, the light will be emitted substantially uniformly across the front face of the light-guide light as a beam of limited angular spread. The output beam will most typically be forwardly-directed, the extent to which it is inclined to the normal to the front face 5 being influenced by the nature of the scattering reflective material 13.

For example, to produce a green output beam, the LEDs employed could be of the type available, under the trade designation LP T672, from Infineon Technologies AG: these provide substantially monochromatic light at a wavelength of about 560 nm. The rear face 6 of the optical cavity 4 comprises a sheet of the above-mentioned "Radiant Light Film Embossed VM2000", embossed with a sand-blast pattern, and the front face 5 comprises a multi-layer polymeric film of the type described in WO 99/36258 designed to transmit normally-incident light having a wavelength below about 590 nm and to reflect normally-incident light having longer wavelengths (or, at least, wavelengths in the range of about 590 to 740 nm). A suitable multilayer polymeric film for the front face 5 is available, under the trade designation "CM 590 Radiant Color Film", from 3M Company, of St. Paul, Minn., USA.

Figure 4:
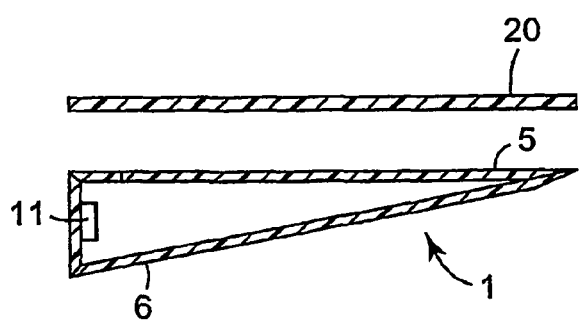
FIGS. 4 and 5 illustrate modifications of the light of FIGS. 1 to 3.

In the arrangement illustrated in FIGS. 1 to 3, the colour of the front face 5 (as seen from the front of the light guide 1) will be the different when it is not illuminated. For example, it has already been mentioned above that a particular multilayer film 15 used in a light guide providing an orange/yellow output beam may appear a blue/green colour when not illuminated. In certain circumstances, for functional or for aesthetic reasons, it may be desirable for the front face of the light guide to have another colour when not illuminated. That can be achieved, for example, by using a multilayer film that, for normally-incident light, is designed to transmit a more limited range of wavelengths but can also be achieved by providing an absorption filter 20 on the output side of the multilayer film as illustrated diagrammatically in FIG. 4. The filter 20 should transmit light at the wavelength of the output beam from the face 5 of the light guide 1 but provide the desired appearance when not illuminated. Suitable absorption filters are dyed gelatine films available, under the trade designations "Wratten Filters", from Eastman Kodak Company of New Jersey, USA.

Figure 5:
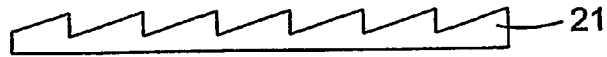
Figure 5:
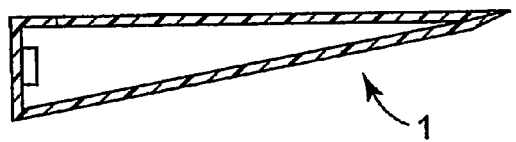

If it is required to change the direction of the output beam of the light guide 1, that can be achieved by adding a suitable prismatic layer 21 on the outer side of the face 5 as illustrated diagrammatically in FIG. 5. If it is required to modify the shape of the output beam (for example, to spread it more in one direction than in another), that can be achieved by adding a suitable lens layer (not illustrated) on the outer side of the face 5. Prismatic and lens layers are already well known for re-directing and re-shaping light beams.

The LEDs 11 that supply the substantially monochromatic light to the light guide 1 can be of any suitable type, although it is desirable that they should provide a wide output beam. Surface mount LEDs are advantageously compact but conventional dome-lens LEDs can also be used, provided that the output beam they provide is not too narrow. Dome-lens LEDs do, however, suffer from the disadvantage that the lens traps some of the light output. It is not necessary for a plurality of LEDs to be mounted along one side of the light guide 1 as illustrated in FIG. 2: in some cases, a single LED could be used in combination with suitable optics for spreading the light so that it enters the light guide along the side 8 in a similar manner. It will also be appreciated that LEDs are not the only monochromatic light sources that could be used with the light guide 1. For example, for lower cost, one or more incandescent sources could be used in combination with a filter that would narrow the spectrum of the output light to that of an LED. The filter could be located immediately adjacent the incandescent light source(s) but the same function could be performed by a filter located in front of the light guide 1 (see the filter 20 in FIG. 4): in the latter case, the filter would then be essential for the provision of a substantially monochromatic beam by the light guide 1.

The nature of the scattering reflective material 13 on the rear face 6 of the optical cavity 4 will affect the shape of the beam of light that is reflected from this surface and, in particular, its angular spread and the degree of asymmetry in the spread. For example, if the material 13 is embossed or formed with dimples or bumps to spread the reflected light beam, the size and shape of those features (e.g. whether they are generally spherical or ovoid in shape) will affect the spread and asymmetry of the reflected beam.

Figure 6:
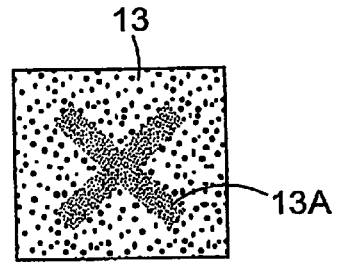
FIG. 6 illustrates the inclusion of a graphic image in the rear face of the light of FIGS. 1 to 3.

If desired, at least one graphic symbol may be incorporated in the light guide 1 so that it is visible, for example, when the front face 5 is illuminated. The graphic symbol may simply be printed either on the reflective material 13 on the rear face 6 of the optical cavity 4, or on the multilayer film 15 forming the front face. Preferably, however, the graphic symbol is incorporated in the reflective material 13 in a way that does not result in increased light absorption at the rear face 6. In the case in which the material 13 is an embossed film, that can be achieved by embossing the graphic symbol in the film in a distinctive manner (e.g. using a different surface roughness 13A as indicated in FIG. 6).

A light-guide light as described above can be formed in any desired size having regard to its intended use and, if required, can be curved in the direction between the end faces 9, 10 (see FIGS. 1 and 2). Although the triangular-shaped cross-section shown in FIG. 3 offers certain advantages, it is not essential: the light guide could, for example, have a rectangular cross-section (in which case the narrow face of the optical cavity at the edge 7 should comprise a reflecting surface). As has already been mentioned, when the light guide has a triangular cross-section as shown in FIG. 3, it is not essential that the narrow end face 8 should be perpendicular to the front face 5.

It is also not essential for the light source(s) 11 of the light-guide light to be positioned to direct light into the optical cavity 4 from one side as illustrated for the light of FIGS. 1 to 3. Depending on the shape of the light guide 1, the light source(s) could be in any suitable location for directing light into the optical cavity, for example adjacent other (or even all) sides of the optical cavity or even within the optical cavity itself (e.g. on the rear surface 6). If the chosen position of the light source(s) results in the direct emission of some light through the front face 5 of the light guide 1, that can be prevented by providing a strip of reflective material (corresponding to the strip 16 of FIGS. 1 to 3) on the front face in the appropriate location.

Figure 7:
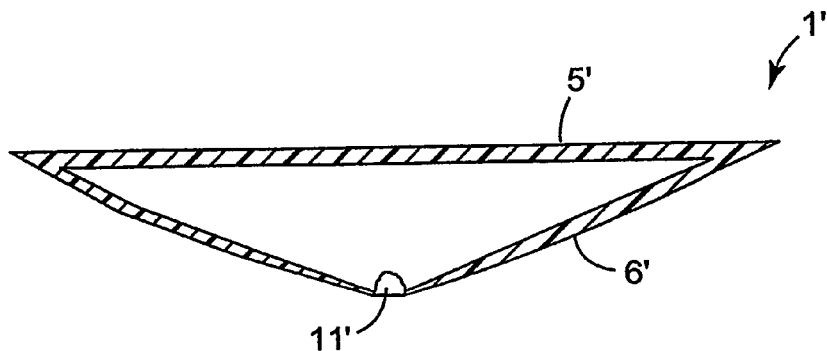
FIG. 7 is a cross-section of another light-guide light constructed in accordance with the invention.

FIG. 7 shows a cross-section of another light-guide light in accordance with the invention. In this case, the rear face 6' of the light guide 1' is conical rather than planar as in FIGS. 1 to 3, and the light source 11' comprises a single LED located at the apex of the rear face. The rear face 6 comprises a similar scattering reflective material to the rear face 6 of the light guide 1 of FIGS. 1 to 3. The front face 5' of the light guide 1' is planar and comprises a similar material to the front face 5 of the light guide 1 of FIGS. 1 to 3. The light guide 1' functions in a similar manner to that of FIGS. 1 to 3 so that light is emitted substantially uniformly across the front face 5' as a beam of limited angular spread.

Figure 8:
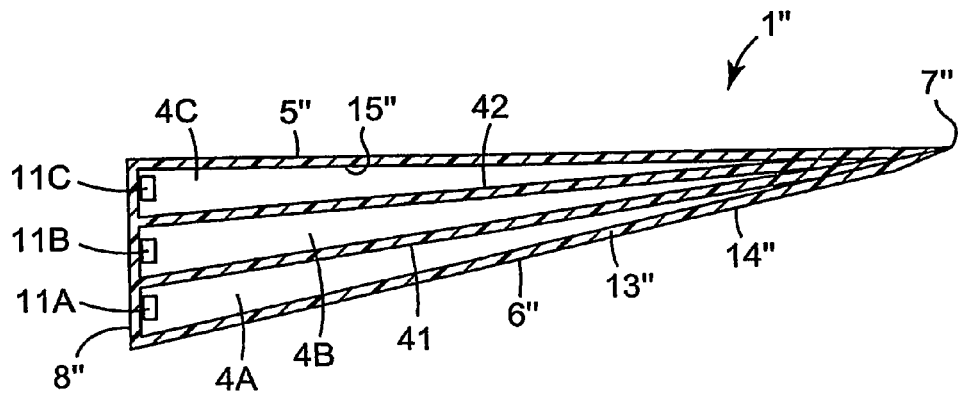
FIGS. 8 and 9 are similar to FIG. 3 and illustrate other light-guide lights.

FIG. 8 is a view similar to that of FIG. 3, but illustrates a modified construction that will produce an output of white light uniformly across the front face 5 of the light guide 1". As in the light guide 1 of FIGS. 1 to 3, the front face 5" of the light guide 1" comprises an interference film 15", and the rear face 6" comprises a sheet material 13" having a scattering reflective surface 14" facing into the optical cavity of the light guide. In this case, the optical cavity is divided substantially equally into three wedge-shaped cavities 4A, 4B and 4C, by two internal partitions 41 and 42 that extend from the edge 7" of the light guide 1' (where the front and rear faces 5", 6" meet) to the opposite edge face 8". Each of the partitions 41, 42 is an interference film, the characteristics of which will be described in greater detail below. Arranged within each of the wedge-shaped cavities 4A, 4B, 4C, along the respective part of the edge face 8", is a respective plurality of LEDs 11A, 11B and 11C.

The LEDs 11A in the rear wedge-shaped cavity 4A (adjacent the rear face 6" of the light guide 1") are selected to provide substantially monochromatic blue light; the LEDs 11B in the middle wedge-shaped cavity 4B are selected to provide substantially monochromatic green light; and the LEDs 11C in the front wedge-shaped cavity 4C (adjacent the front face 5" of the light guide 1") are selected to provide substantially monochromatic red light.

The partition 41 that forms the front face of the cavity 4A is a multi-layer polymeric film that will transmit normally-incident light from the cavity 4A only if it has a wavelength less than a specified value that is just slightly greater than the wavelength of the (blue) light emitted by the LEDs 11A. Such a film will act as a highly-efficient reflector for light from the LEDs 11B that may be incident on it from within the cavity 4B and is embossed in a similar manner to the reflective sheet material 13" on the rear face of the light guide, so that it will function as a scattering reflective material.

Similarly, the partition 42 that forms the front face of the cavity 4B is a multi-layer polymeric film that will transmit normally-incident light from the cavity 4B only if it has a wavelength less than a specified value that is just slightly greater than the wavelength of the (green) light emitted by the LEDs 11B. Such a film will act as a highly-efficient reflector for light from the LEDs 11C that may be incident on it from within the cavity 4C and is embossed in a similar manner to the reflective sheet material 13" on the rear face of the light guide, so that it will function as a scattering reflective material.

The front face 5" of the light guide 1" (which is also the front face of the cavity 4C) is a multi-layer polymeric film that will transmit normally-incident light from the cavity 4C only if it has a wavelength less than a specified value that is just slightly greater than the wavelength of the (red) light emitted by the LEDs 11C.

In the light guide illustrated in FIG. 8, each of the cavities 4A, 4B and 4C functions generally in a similar manner to the optical cavity 4 of the light guide 1 of FIGS. 1 to 3. Consequently, blue light at the wavelength emitted by the LEDs 11A will emerge from the cavity 4A, into the cavity 4B, substantially uniformly across the partition 41 as a beam of limited angular spread. That light will pass through the cavity 4B, be transmitted through the partition 42, pass through the cavity 4C and then be transmitted through the front face 5" of the light guide 1". Similarly, green light at the wavelength emitted by the LEDs 11B will emerge from the cavity 4B, into the cavity 4C, substantially uniformly across the partition 42 as a beam of limited angular spread. That light will pass through the cavity 4C and then be transmitted through the front face 5" of the light guide 1" where it will be combined with the blue light from the diodes 11A and also with the red light from the diodes 11C that will emerge from the cavity 4C. The result will be a beam of white light that emerges substantially uniformly from the face 5".

In a particular light guide of the type shown in FIG. 8, suitable LEDs 11A, 11B and 11C are available, under the trade designations LB E67C, LT E67C and LS E67B respectively, from Infineon Technologies AG of Munich, Germany. Suitable multi-layer polymeric films for the partitions 41 and 42 are available, under the trade designations "Embossed CM 500 Radiant Light Film" and "Embossed CM 590 Radiant Light Film" respectively, from 3M Company of St. Paul, Minn., USA. In a light guide of this type, the front face 5" could be a multi-layer polymeric film of the type described in WO 99/36258, designed to transmit normally-incident light having a wavelength below about 660 nm and to reflect normally-incident light having longer wavelengths.

Figure 9:
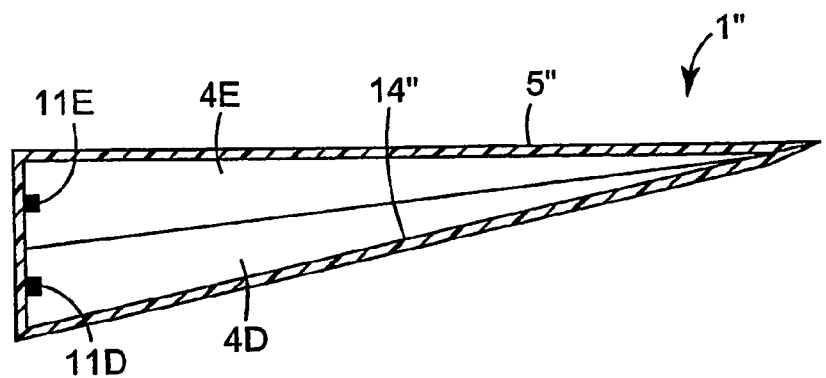

FIG. 9 illustrates a light guide 1" which is similar to that of FIG. 8 but has only two wedge-shaped compartments 4D and 4E containing, respectively, LEDs 11D that emit substantially monochromatic green light and LEDs 11E that emit substantially monochromatic red light. In this case, either the LEDs 11D or the LEDs 11E are operated to produce, at the front face 5" of the light guide, a beam of either green light or red light as required.

Figure 10:
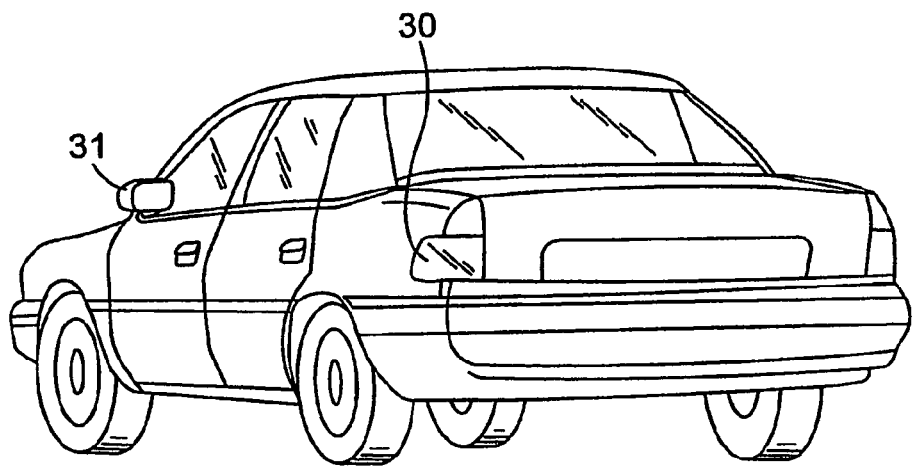
FIG. 10 shows an automotive vehicle in which a light-guide light in accordance with the invention can be employed.
Figure 11:
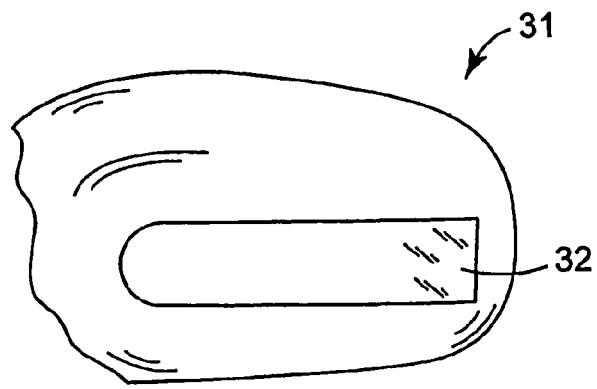
FIG. 11 shows a wing mirror of the vehicle of FIG. 10, incorporating a light-guide light in accordance with the invention.

Light-guide lights as described above with reference to the drawings can, through an appropriate choice of the light sources 11 and the film 15, be used as car signal lamps (e.g. as turn signals and as brake lights) in various locations (e.g. at the front of a vehicle, or at the rear as indicated at 30 in FIG. 10, or even built into the back surface of the wing mirrors 31). FIG. 11, for example, shows the back surface of a car wing mirror incorporating a signal lamp area 32 which faces the oncoming traffic and would be illuminated to indicate that the car is going to turn. The signal lamp may comprise a light-guide light of the type described above with reference to FIGS. 1 to 3, in which case the area 32 is the output face 5 of the light guide. The dimensions of the light guide are selected so that the output face 5 will fill the area 32, with the LEDs arranged along the upper or lower edge of that area. The light guide required to illuminate such an area 32 in a car wing mirror is typically very compact: it may, for example, have a depth at the face 8 of about 10 mm, and a length (between the edges 7, 8) of about 60 mm and is very lightweight.

Light guides of the type described above with reference to the drawings are particularly useful as signal lamps since they provide a monochromatic, uniform appearance across the output face of the light guide. In addition to their use as signal lamps in automotive vehicles, they could be used in traffic signals and in signs of many different types, and also as back lights for instrument panels. A light-guide light of the type shown in FIG. 7, for example, is particularly suitable for use as an instrument panel backlight.

I claim:

1. A light-guide comprising a housing defining a light-guiding optical cavity having first and second major faces, and a light source of substantially monochromatic visible light at a selected wavelength arranged to direct light into the cavity, to be guided between the major faces; wherein
   (a) the first major face comprises an interference film which, for light at the selected wavelength, substantially transmits such light that is incident on the film over a limited angular range and substantially reflects such light that is incident at other angles; and
   (b) the second major face comprises a scattering reflective material having a total reflectance of at least 85% for light at the selected wavelength incident on the surface at any angle;
   wherein light is emitted from the optical cavity substantially uniformly across the first major face in the form of a substantially monochromatic beam of limited angular spread and said scattering reflective material defines either a wide scattering reflective surface having a dispersion angle between about 15 degrees and about 45 degrees or a narrow scattering reflective surface having a dispersion angle of less than about 15 degrees.

2. A light-guide light as claimed in claim 1, in which, at the said selected wavelength, the interference film transmits substantially only light that is incident on the film within a restricted range of angles centered on normal incidence.

3. A light-guide light as claimed in claim 1. in watch the second major face comprises a specularly-reflecting material having a light-spreading structure formed thereon.

4. A light as claimed in claim 1, in which the light source comprises at least one substantially point source, arranged to direct light into the optical cavity.

5. A light-guide light as claimed in claim 1, further including a light diverter positioned to receive, and change the direction of, the beam of light emitted from the first major face of the optical cavity.

6. A light-guide light as claimed in claim 1, in which a graphic symbol is formed on one of the major faces of the optical cavity.

7. A signal lamp for an automotive vehicle, incorporating a light-guide light as claimed in claim 1.

8. A light-guide light as claimed in claim 1, wherein said scattering reflective material defines a wide scattering reflective surface having a dispersion angle of between about 15 degrees and about 45 degrees.

9. A light-guide light as claimed in claim 1, wherein said scattering reflective material defines a narrow scattering reflective surface having a dispersion angle of less than about 15 degrees.

10. A light-guide light as claimed in claim 1, wherein said scattering reflective material can reflect an incident collimated beam into a broadened beam having a dispersion angle of less than about 45 degrees.

11. A light-guide light comprising a housing defining a light-guiding optical cavity having first and second major faces, and a light source of substantially monochromatic visible light at a selected wavelength arranged direct light into the cavity, to be guided between the major faces; wherein
   (a) the first major face comprises an interference film which, for light at the selected wavelength, substantially transmits such light that is incident on the film over a limited angular range and substantially reflects such light that is incident at other angles; and
   (b) the second major face comprises a scattering reflective material having a total reflectance of at least 85% for light at the selected wavelength incident on the surface at any angle,
   wherein light is emitted from the optical cavity substantially uniformly across the first major face in the form of a substantially monochromatic beam of limited angular spread, and said light-guide light further comprises an absorption filter arranged to receive light from the interference film, in which the absorption filter transmits substantially only light at the said selected wavelength and appears a different color when unlit.

12. A light-guide light comprising a housing defining light-guiding optical cavity having first and second major faces, and a light source arranged to direct visible light into the cavity, to be guided between the major faces; wherein (a) the first major face comprises a multi-layer polyimeric film which, at least for light at a selected wavelength, substantially transmits such light that is incident on the film over a limited angular range and substantially reflects such light that is incident at other angles, and an absorption filter arranged to receive light from the multi-layer film, the absorption filter transmitting light at the said selected wavelength; and (b) the second major face comprises a scattering reflective material having a reflectance of at least 85% for visible light incident on the surface at any angle;

whereby light from within the optical cavity is emitted substantially uniformly across the first major face in the form of a substantially monochromatic beam of limited angular spread and said scattering reflective material defines either a wide scattering reflective surface having a dispersion angle between about 15 degrees and about 45 degrees or a narrow scattering reflective surface having a dispersion angle of loss than about 15 degrees.

13. A light-guide light as claimed in claim 12, in which the optical cavity is generally wedge-shaped, the said first and second major faces being inclined to one another and meeting at one side of the optical cavity, and the light source being arranged to direct light into the cavity from the opposite side.

14. A light-guide light as claimed in claim 12, in which the second major face has a conical form, the light source being located at the apex of the second major face to direct light into the optical cavity.

15. A light-guide light as claimed in claim 12, in which, at the said selected wavelength, the interference film transmits substantially only light that is incident on the film within a restricted range of angles centered on normal incidence.

16. A light-guide light as claimed in claim 12, in which the second major face has a total reflectance of at least 98% for visible light incident on the surface at any angle.

17. A light-guide light as claimed in claim 12, in which the second major face comprises a specularly-reflecting material having a light-spreading structure formed thereon.

18. A light-guide light as claimed in claim 17, in which the second major face comprises an optical film or sheet metal.

19. A light-guide light as claimed in claim 17, in which a graphic symbol is formed in the light spreading structure on the second major face of the optical cavity.

20. A light-guide light as claimed in claim 12, in which the light source comprises at least one substantially point source, arranged to direct light into the optical cavity.

21. A light-guide light as claimed in claim 12, further including a light diverter positioned to receive, and change the direction of, the beam of light emitted from the first major face of the optical cavity.

22. A light-guide light as claimed in claim 12, in which a graphic symbol is formed on one of the major faces of the optical cavity.

23. A signal lamp for an automotive vehicle, incorporating a light-guide light as claimed in claim 12.

* * * * *

UNITED STATES PATENT AND TRADEMARK OFFICE
CERTIFICATE OF CORRECTION

| | |
|---|---|
| PATENT NO. | : 8,393,773 B2 |
| APPLICATION NO. | : 10/491504 |
| DATED | : March 12, 2013 |
| INVENTOR(S) | : Mike C Lea |

It is certified that error appears in the above-identified patent and that said Letters Patent is hereby corrected as shown below:

In the Specification:

Column 6
Line 7, delete "beams;" and insert -- beams --

In the Claims:

Column 9
Line 61, in claim 1, delete "comprising" and insert -- light comprising --

Column 10
Line 21, in claim 3, delete "1. in watch" and insert -- 1, in which --

Line 24, in claim 4, delete "light" and insert -- light-guide light --

Line 51, in claim 11, delete "direct" and insert -- to direct --

Column 11
Line 3, in claim 12, delete "defining" and insert -- defining a --

Line 8, in claim 12, delete "polyimeric" and insert -- polymeric --

Line 26, in claim 12, delete "loss" and insert -- less --

Signed and Sealed this
Eighteenth Day of June, 2013

Teresa Stanek Rea
*Acting Director of the United States Patent and Trademark Office*